(12) United States Patent
Qin (10) Patent No.: US 11,305,848 B2
(45) Date of Patent: Apr. 19, 2022

(54) LAYERED DATA ACQUISITION SYSTEM APPLIED TO MARINE INFORMATION NETWORK AND METHOD THEREOF

(71) Applicant: Chuan Qin, Beijing (CN)

(72) Inventor: Chuan Qin, Beijing (CN)

( * ) Notice: Subject to any disclaimer, the term of this patent is extended or adjusted under 35 U.S.C. 154(b) by 0 days.

(21) Appl. No.: 17/436,591

(22) PCT Filed: Jun. 23, 2020

(86) PCT No.: PCT/CN2020/097722
§ 371 (c)(1),
(2) Date: Sep. 5, 2021

(87) PCT Pub. No.: WO2021/243767
PCT Pub. Date: Dec. 9, 2021

(65) Prior Publication Data
US 2022/0041255 A1 Feb. 10, 2022

(30) Foreign Application Priority Data
Jun. 1, 2020 (CN) .......................... 202010486637.1

(51) Int. Cl.
*B63B 35/00* (2020.01)
*G08G 3/00* (2006.01)
*H04L 67/12* (2022.01)

(52) U.S. Cl.
CPC ............... *B63B 35/00* (2013.01); *G08G 3/00* (2013.01); *H04L 67/12* (2013.01); *B63B 2035/007* (2013.01)

(58) Field of Classification Search
CPC .... B63B 35/00; B63B 2035/007; G08G 3/00; H04L 67/12
See application file for complete search history.

(56) References Cited

U.S. PATENT DOCUMENTS 5,257,241 A * 10/1993 Henderson ........... G01V 1/3808
181/110
7,539,503 B2 * 5/2009 Suzuki .................. H04W 40/24
370/254
(Continued)

FOREIGN PATENT DOCUMENTS

CN 104010336 A 8/2014
CN 105072656 A 11/2015
(Continued)

OTHER PUBLICATIONS

International Search Report for PCT/CN2020/097722 dated Feb. 25, 2021, ISA/CN.
(Continued)

*Primary Examiner* — Frederick M Brushaber
(74) *Attorney, Agent, or Firm* — Yue (Robert) Xu; Apex Attorneys at Law, LLP (57) ABSTRACT

A hierarchical data acquisition system and method applied to a marine information network are provided. Multiple sensor nodes are arranged in clusters, each of the clusters includes a cluster head node and multiple ordinary nodes. The multiple ordinary nodes acquire data information of a seafloor and transmit the acquired data information to the cluster head node, and the cluster head node aggregate the data and transmits the aggregated data to an autonomous underwater vehicle, reducing energy consumption of each of the sensor nodes, prolonging service lives of sensors of a data acquisition layer, and improving data acquisition efficiency of a data acquisition layer. In addition, after each of data acquisition periods, a sensor node in each of the clusters is selected as a cluster head node in a next data acquisition cycle. Cluster head nodes are continuously updated in cycles.

6 Claims, 5 Drawing Sheets

(56) References Cited

U.S. PATENT DOCUMENTS

| | | | |
|---|---|---|---|
| 7,747,710 B1* | 6/2010 | Osburn, III | H04L 63/0428 709/220 |
| 8,462,691 B2* | 6/2013 | Tateson | H04L 45/124 370/315 |
| 8,686,849 B2* | 4/2014 | Lee | G08B 25/014 340/502 |
| 8,913,488 B2* | 12/2014 | Arsenault | H04W 76/19 370/225 |
| 8,953,647 B1* | 2/2015 | Mead | H04B 10/808 372/6 |
| 9,049,576 B2* | 6/2015 | Arsenault | H04L 41/5054 |
| 9,094,119 B2* | 7/2015 | Huen | H04B 10/1129 |
| 9,681,485 B2* | 6/2017 | Arsenault | H04L 67/148 |
| 9,875,642 B2* | 1/2018 | Arsenault | G08B 25/10 |
| 10,116,511 B2* | 10/2018 | Cho | H04L 41/12 |
| 2004/0066313 A1* | 4/2004 | Ong | G08C 19/04 340/870.11 |
| 2006/0176863 A1* | 8/2006 | Robinson | H04L 45/44 370/338 |
| 2017/0261629 A1* | 9/2017 | Gunnarsson | G01V 3/081 |
| 2019/0106867 A1* | 4/2019 | Mariano | F16K 31/06 |

FOREIGN PATENT DOCUMENTS

| | | |
|---|---|---|
| CN | 109040954 A | 12/2018 |
| CN | 109769222 A | 5/2019 |
| CN | 110160546 A | 8/2019 |
| CN | 110784842 A | 2/2020 |
| CN | 110989612 A | 4/2020 |
| CN | 111026126 A | 4/2020 |
| CN | 111200856 A | 5/2020 |

OTHER PUBLICATIONS

Shen Chun, et al., An Ant Colony Algorithm Based on Direction Heuristic Factor, china academic journal electronic publishing house, vol. 33, No. 8, 2006.

Hou mengting et al., Ant colony optimization multipath routing algorithm adopted angle factor, Computer Engineering and Applications, p. 107-112, 2017.

Shaobin Cai et al., Data Collection in Underwater Sensor Networks based on Mobile Edge Computing, IEEE, vol. 7, 2019.

* cited by examiner

Figure 9

LAYERED DATA ACQUISITION SYSTEM APPLIED TO MARINE INFORMATION NETWORK AND METHOD THEREOF

This application is the national phase of International Application No. PCT/CN2020/097722, titled "LAYERED DATA ACQUISITION SYSTEM APPLIED TO MARINE INFORMATION NETWORK AND METHOD THEREOF", filed on Jun. 23, 2020, which claims the priority to Chinese Patent Application No. 202010486637.1, titled "LAYERED DATA ACQUISITION SYSTEM APPLIED TO MARINE INFORMATION NETWORK AND METHOD THEREOF", filed on Jun. 1, 2020 with the Chinese Patent Office, both of which are incorporated herein by reference in their entireties.

FIELD

The present disclosure relates to the technical field of marine data information acquisition, and in particular to a hierarchical data acquisition system applied to a marine information network and a hierarchical data acquisition method applied to a marine information network.

BACKGROUND

In recent years, marine communication networks attracted attention. Understanding ocean, developing ocean, managing ocean and establishing a marine power are elevated to a strategic height. To support the establishment of a marine power, a marine information network is required. How to design a stable, efficient and low-energy data acquisition system applied to the marine information network is a core task.

At present, in the conventional data acquisition system, multiple sensor nodes are arranged at different depths of an ocean to acquire and transmit underwater information. Data of the ocean is transmitted along a direction from the bottom to the surface of the ocean to a fixed base station (ship) on the water surface based on a multi-hop communication between nodes. However, the multi-hop communication has the following three problems. First, due to the fact of weak underwater acoustic channel and low communication rate, the multi-hop communication has a large data packet loss rate and a large system delay. Second, due to that all the sensors, as fixed relay nodes, operate at high load, the sensor nodes consume much energy and have high mortality rates, and the data acquisition efficiency is low. Third, due to that the data transmission link is fixed, energy consumption of a node may cause the failure of the entire connection, resulting in a poor robustness of the system.

In addition, a data acquisition system is provided. In the system, sensors arranged in the seafloor acquire data information, an autonomous underwater vehicle (AUV) dives, traverses all sensors to acquire data information of the sensors, then returns to a water surface base station and transmits the acquired data information to the base station. With the data acquisition system, although the problem of unstable communication and transmission in the conventional data acquisition system can be solved, the sensors in the data acquisition system are required to perform multiple operations, such as data acquisition, data fusion and data transmission, resulting in high energy consumption, short service life and low data acquisition efficiency. In addition, the path planning for the autonomous underwater vehicle (AUV) in the data acquisition system has the following two shortcomings. First, in the data acquisition system, an ant algorithm is usually used to solve the traveling salesman problem. In the conventional ant algorithm, only a pheromone concentration in a current state is considered without considering influence of a pheromone concentration in a subsequent state, resulting in problems such as low solution efficiency and easily falling into local optimization. Second, in the conventional ant algorithm, only an influence of a distance is considered in path planning without considering an influence of a change in angle, resulting in a lot of energy consumption in the movement of the AUV, and thereby affecting the overall data acquisition efficiency.

SUMMARY

A hierarchical data acquisition system and method applied to a marine information network are provided according to the present disclosure, to solve the technical problems of high energy consumption and low efficiency in the conventional data acquisition system applied to a marine information network.

A hierarchical data acquisition system applied to a marine information network is provided according to a first aspect of the present disclosure. The system includes a water surface base station, a data acquisition layer, and a data acquisition layer. The data acquisition layer is configured to acquire data information of a seafloor and includes multiple sensor nodes anchored on the seafloor. The multiple sensor nodes are arranged in clusters. Each of the clusters includes one cluster head node and multiple ordinary nodes. The multiple ordinary nodes are configured to acquire the data information of the seafloor and transmit the data information to the cluster head node to aggregate the data information. The data transmission layer is arranged above the data acquisition layer and is configured to transmit the data information of the seafloor acquired by the data acquisition layer to the water surface base station. The data transmission layer includes an autonomous underwater vehicle. The autonomous underwater vehicle is configured to start from the water surface base station to traverse the cluster head node of each of the clusters to acquire the aggregated data information, and then drive back to the water surface base station to transmit the acquired data information of the seafloor to the water surface base station. After each of data acquisition periods, a sensor node in each of the clusters is determined as a cluster head node in a next data acquisition period.

Further, a probability of each of sensor nodes in a cluster except a cluster head node of the cluster to be determined as a cluster head node of the cluster in the next data acquisition period is calculated by using the following equation:

$$T(s) = \begin{cases} \dfrac{1}{1+e^{-(w_1 d_s + w_2 E_j + \lambda)}} & \text{if } s \in G, \\ 0 & \text{otherwise} \end{cases}$$

and the cluster head node of the cluster in the next data acquisition period is determined based on a calculation result, where $T(s)$ represents a probability of a sensor node s to be determined as the cluster head node of the cluster in the next data acquisition period, G represents a set of all ordinary nodes in the cluster in a current round, $w_1$ and $w_2$ represent weight constant coefficients, $d_s$ represents a reciprocal of a value of a distance between the sensor node s and a center of a cluster corresponding to the sensor node s, $E_j$ represents a ratio of remaining energy to initial energy of the sensor node s, and λ represents an arbitrary constant.

Further, the autonomous underwater vehicle is configured to plan a running path using an ant algorithm based on a distance, an angle and a reward, and the algorithm includes:

assuming that there are m ants and $N_{ant}$ position points, and all ants are controlled to start from a position point of the water surface base station, and creating a taboo list for indicating a set of position points passed by the ants, and adding, each time an ant passes by a position point, the position point to the taboo list;

calculating a transition probability $p_{ij}^{k}(t)$ of a first ant from a position point i to a position point j at a time instant when the first ant start from the position point of the base station, selecting a next position point and updating the taboo list, calculating another transition probability, then selecting a next position point and updating the taboo list until the ant traverses all the $N_{ant}$ position points and dies, where the transition probability of the ant is calculated by using the following equation:

$$p_{ij}^{k}(t) = \begin{cases} \frac{[\tau_{ij}(t)]^{\alpha}[\eta_{ij}(t)]^{\beta}}{\sum_{s \in n(i)}[\tau_{is}(t)]^{\alpha}[\eta_{is}(t)]^{\beta}}, & j \in n(i), \\ 0 & \text{others} \end{cases}$$

where s represents a position at a next time instant, n(i) represents a set of position points adjacent to the position point i, α and β represent weight constants, $\tau_{ij}(t)$ represents a concentration of pheromone, $\eta_{ij}(t)$ represents a heuristic factor and is calculated by using the equation of $$\eta_{ij}(t) = \frac{1}{d_{ij}} + \frac{1}{r_{ij}},$$

where $d_{ij}$ represents a distance from the position point i to the position point j, and $r_{ij}$ represents an offset angle from the position point i to the position point j;

calculating a concentration $\Delta\tau_{ij}^{k}$ of pheromone left by the ant on each of paths by using the following equation:

$$\Delta\tau_{ij}^{k} = \frac{Q_1}{d_{ij}} + \frac{Q_2}{r_{ij}} + \gamma \sum_{s \in n(j), s \neq i} P_{js}\Delta\tau_{js}^{k}$$

where $Q_1$ and $Q_2$ represent arbitrary constants, γ represents a reward factor indicating a degree of an influence on a current path selection by a concentration of pheromone of a subsequent path, γ ranges from 0 to 1, and $P_{js}$ represents a transfer probability of the ant at the next time instant;

repeating the above processing until each of the m ants traverses all the position points, and calculating a pheromone increment $\Delta\tau_{ij}$ and a total pheromone $\tau_{ij}(t+1)$ of each of the paths by using the following equations:

$$\Delta\tau_{ij} = \sum_{k=1}^{m}\Delta t_{ij}^{m}$$

$$\tau_{ij}(t+1) = (1-\rho)\tau_{ij}(t) + \Delta\tau_{ij}$$

where ρ represents a pheromone evaporation coefficient indicating an amount of reduced pheromone, and (1−ρ) represents a pheromone residual coefficient indicating a concentration of remaining pheromone;

recording a sum of distances and a sum of offset angles generated in a current iteration, and updating a current optimal path based on a recorded result; and continuously performing iteration until a predetermined number of iterations is reached or a stagnation occurs, then stopping iteration and determining an optimal path updated after a last iteration as the running path.

Further, the offset angle $r_{ij}$ from the position point i to the position point j is calculated by using the following equation:

$$r_{ij} = \varphi - \theta = \varphi - \arctan\frac{(y_j - y_i)}{(x_j - x_i)}$$

where $x_i$ and $y_i$ respectively represent an abscissa of the position point i and an ordinate of the position point i, $x_j$ and $y_j$ respectively represent an abscissa of the position point j and an ordinate of the position point j, φ represents a current orientation angle of the autonomous underwater vehicle, and θ represents an angle between a vector $\vec{ij}$ and a horizontal direction.

Further, the multiple sensor nodes are arranged in clusters by:

in cases that the multiple sensor nodes are divided into 1 to n clusters, calculating, for each of the 1 to n clusters, a sum of squared errors (SSE) of sensor nodes to a cluster center by using the following equation:

$$SSE = \sum_{i=1}^{k}\sum_{x \in C_i}\|x - \bar{x}_i\|_2^2$$

where $C_i$ represents a set of all sensor nodes in a cluster, x represents a value of a coordinate of a sensor node, $\bar{x}_i$ represents a value of a coordinate of a cluster center, k represents the number of the clusters;

in a case that a difference of SSEs of two adjacent clusters reaches maximum, determining the number of the clusters as the required number k of clusters, where k is calculated by using the following equation:

$$k = \underset{k}{\mathrm{argmax}}\Delta S(k) - \Delta S(k+1)$$

where ΔS represents the difference of SSEs of two adjacent clusters;

randomly selecting k sensor nodes as initial cluster centers based on the calculated k, calculating SSEs of remaining sensor nodes to the k cluster centers, allocating, for each of the initial cluster centers, sensor nodes from the remaining sensor nodes based on a closest distance rule, and continuously updating the cluster centers and the SSEs until a convergence condition is met, where the cluster centers are updated by using the following equation:

$$\bar{x}_i = \frac{1}{C_i}\sum_{x \in C_i}x$$

and the convergence condition is expressed as:

$$|SSE_1 - SSE_2| < \varepsilon$$

where $|C_i|$ represents the number of sensor nodes in a cluster, $\varepsilon$ represents a minimum threshold, $SSE_1$ represents an SSE generated in a current iteration, and $SSE_2$ represents an SSE generated in a previous iteration; and after iteration, determining a sensor node closest to each of the cluster centers as an initial cluster head node.

A hierarchical data acquisition method applied to a marine information network is further provided according to another aspect of the present disclosure. The method includes the following steps:

step S1, arranging and anchoring multiple sensor nodes in clusters on a seafloor, where each of the clusters includes a cluster head node and multiple ordinary nodes, the multiple ordinary nodes acquires data information of the seafloor and transmit the data information to the cluster head node to aggregate the data information;

step S2, releasing an autonomous underwater vehicle from a position of a water surface base station, and controlling the autonomous underwater vehicle to traverse the cluster head node of each of the clusters to acquire the aggregated data information and then to drive back to the water surface base station;

step S3, controlling the autonomous underwater vehicle to transmit the acquired data information of the seafloor to the water surface base station; and step S4, after each of data acquisition periods, determining a sensor node in each of the clusters as a cluster head node in a next data acquisition period.

Further, a probability of each of sensor nodes in a cluster to be determined as a cluster head node in the next data acquisition period is calculated in step 4 by using the following equation:

$$T(s) = \begin{cases} \dfrac{1}{1 + e^{-(w_1 d_s + w_2 E_j + \lambda)}} & \text{if } s \in G, \\ 0 & \text{otherwise} \end{cases}$$

and the cluster head node in the next data acquisition period is determined based on a calculation result, in the above equation, T(s) represents a probability of a sensor node s to be determined as the cluster head node of the cluster in the next data acquisition period, G represents a set of all ordinary nodes in the cluster in a current round, $w_1$ and $w_2$ represent weight constant coefficients, $d_s$ represents a reciprocal of a value of a distance between the sensor node s and a center of a cluster corresponding to the sensor node s, $E_j$ represents a ratio of remaining energy to initial energy of the sensor node s, and $\lambda$ represents an arbitrary constant.

Further, a running path is planed using an ant algorithm based on a distance, an angle and a reward in step S2, and the algorithm includes the following steps:

step S21: assuming that there are m ants and $N_{ant}$ position points, and all ants are controlled to start from a position point of the water surface base station, and creating a taboo list for indicating a set of position points passed by the ants, and adding, each time an ant passes by a position point, the position point to the taboo list;

step S22: calculating a transition probability $p_{ij}^k(t)$ of a first ant from a position point i to a position point j at a time instant when the first ant start from the position point of the base station, selecting a next position point and updating the taboo list, calculating another transition probability, then selecting a next position point and updating the taboo list until the ant traverses all the $N_{ant}$ position points and dies, wherein the transition probability of the ant is calculated by using the following equation:

$$p_{ij}^k(t) = \begin{cases} \dfrac{[\tau_{ij}(t)]^\alpha [\eta_{ij}(t)]^\beta}{\sum_{s \in n(i)} [\tau_{is}(t)]^\alpha [\eta_{is}(t)]^\beta}, & j \in n(i), \\ 0 & \text{others} \end{cases}$$

where s represents a position at a next time instant, n(i) represents a set of position points adjacent to the position point i, $\alpha$ and $\beta$ represent weight constants, $\tau_{ij}(t)$ represents a concentration of pheromone, $\eta_{ij}(t)$ represents a heuristic factor and is calculated by using the equation of $$\eta_{ij}(t) = \frac{1}{d_{ij}} + \frac{1}{r_{ij}},$$

where $d_{ij}$ represents a distance from the position point i to the position point j, and $r_{ij}$ represents an offset angle from the position point i to the position point j;

step S23: calculating a concentration $\Delta \tau_{ij}^k$ of pheromone left by the ant on each of paths by using the following equation:

$$\Delta \tau_{ij}^k = \frac{Q_1}{d_{ij}} + \frac{Q_2}{r_{ij}} + \gamma \sum_{s \in n(j), s \neq i} P_{js} \Delta \tau_{js}^k,$$

where $Q_1$ and $Q_2$ represent arbitrary constants, $\gamma$ represents a reward factor indicating a degree of an influence on a current path selection by a concentration of pheromone of a subsequent path, $\gamma$ ranges from 0 to 1, and $P_{js}$ represents a transfer probability of the ant at the next time instant;

step S24: repeating steps 22 and 23 until each of the m ants traverses all the position points, and calculating a pheromone increment $\Delta \tau_{ij}$ and a total pheromone $\tau_{ij}(t+1)$ of each of the paths by using the following equations:

$$\Delta \tau_{ij} = \sum_{k=1}^{m} \Delta \tau_{ij}^m$$

$$\tau_{ij}(t+1) = (1 - \rho) \tau_{ij}(t) + \Delta \tau_{ij}$$

where $\rho$ represents a pheromone evaporation coefficient indicating an amount of reduced pheromone, and $(1-\rho)$ represents a pheromone residual coefficient indicating a concentration of remaining pheromone;

step S25: recording a sum of distances and a sum of offset angles generated in a current iteration, and updating a current optimal path based on a recorded result; and step S26: continuously performing iteration until the number of iterations reaches a predetermined number or a stagnation occurs, then stopping iteration and determining an optimal path updated after a last iteration as the running path.

Further, the offset angle $r_{ij}$ in step S22 is calculated by using the following equation:

$$r_{ij} = \varphi - \theta = \varphi - \arctan\frac{(y_j - y_i)}{(x_j - x_i)}$$

where $x_i$ and $y_i$ respectively represent an abscissa of the position point i and an ordinate of the position point i, $x_j$ and $y_j$ respectively represent an abscissa of the position point j and an ordinate of the position point j, $\varphi$ represents a current orientation angle of the autonomous underwater vehicle, and $\theta$ represents an angle between a vector $\vec{ij}$ and a horizontal direction.

Further, the arranging multiple sensor nodes in clusters in step S1 includes the following steps:

step S11: in cases that the plurality of sensor nodes are divided into 1 to n clusters, calculating, for each of the 1 to n clusters, a sum of squared errors (SSE) of sensor nodes to a cluster center by using the following equation:

$$SSE = \sum_{i=1}^{k} \sum_{x \in C_i} \|x - \overline{x_i}\|_2^2$$

where $C_i$ represents a set of all sensor nodes in a cluster, x represents a value of a coordinate of a sensor node, $\overline{x_i}$ represents a value of a coordinate of a cluster center, k represents the number of the clusters;

in a case that a difference of SSEs of two adjacent clusters reaches maximum, determining the number of the clusters as the required number k of clusters, wherein k is calculated by using the following equation:

$$k = \underset{k}{\mathrm{argmax}}\; \Delta S(k) - \Delta S(k+1)$$

where $\Delta S$ represents the difference of SSEs of two adjacent clusters;

step S12: randomly selecting k sensor nodes as initial cluster centers based on the calculated k, calculating SSEs of remaining sensor nodes to the k cluster centers, allocating, for each of the initial cluster centers, sensor nodes from the remaining sensor nodes based on a closest distance rule, and continuously updating the cluster centers and the SSEs until a convergence condition is met, where the cluster centers are updated by using the following equation:

$$\overline{x_i} = \frac{1}{|C_i|} \sum_{x \in C_i} x$$

and the convergence condition is expressed as:

$$|SSE_1 - SSE_2| < \varepsilon$$

where $|C_i|$ represents the number of sensor nodes in a cluster, $\varepsilon$ represents a minimum threshold, $SSE_1$ represents an SSE generated in a current iteration, and $SSE_2$ represents an SSE generated in a previous iteration; and step S13: after iteration, determining a sensor node closest to each of the cluster centers as an initial cluster head node.

The present disclosure has the following effects.

In the hierarchical data acquisition system applied to a marine information network according to the present disclosure, multiple sensor nodes are arranged in clusters. For each of the clusters, one cluster head node and multiple ordinary nodes are included, the multiple ordinary sensor nodes acquire the data information of the seafloor and transmit the data information to the cluster head node, and the cluster head node aggregates the data from the ordinary nodes in the cluster and transmits the aggregated data to an autonomous underwater vehicle. The ordinary nodes perform data acquisition function and the cluster head node performs data transmission function, greatly reducing energy consumptions of the sensor nodes, prolonging service lives of the sensors in the data acquisition layer, and greatly improving the data acquisition efficiency of the data acquisition layer. In addition, after each of data acquisition periods, a sensor node in each of the clusters is determined as a cluster head node in a next data acquisition period. Since energy consumption of the cluster head node is higher than energy consumption of the ordinary nodes, the sensor, serving as the cluster head node, consumes energy very quickly and then dies soon, resulting in low data acquisition efficiency of the cluster. Thus, each of the cluster head nodes are determined in each of the acquisition periods in the system according to the present disclosure, well balancing energy consumption of all sensor nodes in the cluster. The original cluster head node with low energy may serve as an ordinary node to perform data acquisition function, and the new cluster head node with high energy may perform data transmission function well. The cluster head nodes are continuously updated in cycles. Finally, in a case that all the sensor nodes run out of energy and tend to death, all the sensor nodes are replaced at one time, greatly improving the data acquisition efficiency of the cluster, maximally using the energy of all sensor nodes in the cluster, thereby achieving energy saving and high efficiency.

In addition, the hierarchical data acquisition method applied to a marine information network according to the present disclosure has the advantages described above.

In addition to the purposes, features and advantages described above, the present disclosure has other purposes, features and advantages. The present disclosure is described in detail below with reference to the drawings.

BRIEF DESCRIPTION OF THE DRAWINGS

The drawings that form part of the preset disclosure are used to provide a further understanding of the present disclosure. The schematic embodiments of the present disclosure and the descriptions of the embodiments are used for explaining the present disclosure rather than limiting the present disclosure. In the drawings.

DETAILED DESCRIPTION OF THE EMBODIMENTS

Embodiments of the present disclosure are described in detail below in conjunction with the drawings, and the present disclosure may be implemented in many different ways defined and covered by the embodiments described below.

Figure 1:
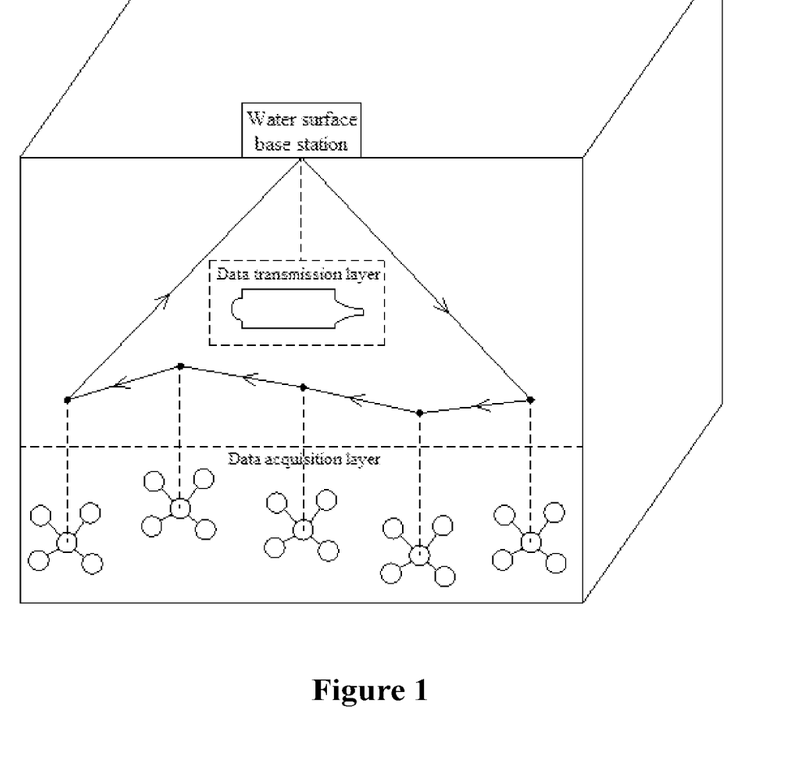
FIG. 1 is schematic diagram showing a layout of a hierarchical data acquisition system applied to a marine information network according to a preferred embodiment of the present disclosure.

As shown in FIG. 1, a hierarchical data acquisition system applied to a marine information network is provided according to a preferred embodiment of the present disclosure. The system includes a water surface base station, a data acquisition layer, and a data transmission layer. The data acquisition layer is configured to acquire data information of a seafloor. The data transmission layer is arranged above the data acquisition layer and is configured to transmit the data information of the seafloor acquired by the data acquisition layer to the water surface base station. The data acquisition layer includes multiple sensor nodes that are anchored on the seafloor. The multiple sensor nodes are arranged in clusters. Each of the clusters includes one cluster head node and multiple ordinary nodes. The multiple ordinary nodes are configured to acquire the data information of the seafloor and transmit the acquired seafloor data information to the cluster head node to aggregate the data information. The data transmission layer includes an autonomous underwater vehicle. The autonomous underwater vehicle is configured to start from the water surface base station to traverse the cluster head node of each of the clusters to acquire the aggregated data information, and then drive back to the water surface base station to transmit the acquired data information of the seafloor to the water surface base station. After each of data acquisition periods, a sensor node in each of the clusters is determined as a cluster head node in a next data acquisition period. It should be understood that after the autonomous underwater vehicle moves to a position at a height above a cluster head node, for example, a position at a height ranging from 20 m to 50 m above the cluster head node, and the position is preferably arranged at a height of 30 m above the cluster head node, the autonomous underwater vehicle quickly establishes a communication link with the cluster head node and performs data transmission. After performing data transmission with the cluster head node, the autonomous underwater vehicle drives to a cluster head node of a next cluster. The autonomous underwater vehicle performs data transmission with the cluster head node of each of the clusters sequentially, and finally brings the data of all the cluster head nodes to the water surface base station. In addition, the cluster head node of each of the clusters is communicatively connected with the ordinary nodes of the cluster. Each of the sensor nodes has an autonomous control function to perform autonomous switching between the data acquisition function and the data transmission function. The autonomous switching is performed according to the conventional technology and is not repeated herein. It should be understood that due to the hierarchical arrangement of the water surface base station, the data transmission layer and the data acquisition layer, the autonomous underwater vehicle of the data transmission layer may directly sink vertically from the plane where the water surface base station is located to a horizontal plane at a height above the data acquisition layer, and then performs data acquisition in the horizontal plane along a running path. Alternatively, the autonomous underwater vehicle may directly sink from the position of the water surface base station to a position at a height above a first cluster head node, and then performs data acquisition along a running path in a plane. The running path along which the autonomous underwater vehicle moves from the horizontal plane where the water surface base station is located to a horizontal plane at a height above the data acquisition layer is not limited in the present disclosure.

It should be understood that in the hierarchical data acquisition system applied to a marine information network according to the embodiment, multiple sensor nodes are arranged in clusters. For each of the clusters, one cluster head node and multiple ordinary nodes are included, the multiple ordinary sensor nodes acquire the data information of the seafloor and transmit the data information to the cluster head node, and the cluster head node aggregates the data from the ordinary nodes in the cluster and transmits the aggregated data to an autonomous underwater vehicle. The ordinary nodes perform data acquisition function and the cluster head node performs data transmission function, greatly reducing energy consumptions of the sensor nodes, prolonging service lives of the sensors in the data acquisition layer, and greatly improving the data acquisition efficiency of the data acquisition layer. In addition, after each of data acquisition periods, a sensor node in each of the clusters is determined as a cluster head node in a next data acquisition period. Since energy consumption of the cluster head node is higher than energy consumption of the ordinary nodes, the sensor, serving as the cluster head node, consumes energy very quickly and then dies soon, resulting in low data acquisition efficiency of the cluster. Thus, each of the cluster head nodes are determined in each of the acquisition periods in the system according to the present disclosure, well balancing energy consumption of all sensor nodes in the cluster. The original cluster head node with low energy may serve as an ordinary node to perform data acquisition function, and the new cluster head node with high energy may perform data transmission function well. The cluster head nodes are continuously updated in cycles. Finally, in a case that all the sensor nodes run out of energy and tend to death, all the sensor nodes are replaced at one time, greatly improving the data acquisition efficiency of the cluster, maximally using the energy of all sensor nodes in the cluster, thereby achieving energy saving and high efficiency.

It should be understood that in order to avoid generating redundant information in a cluster, the cluster head node of the cluster performs fusion processing on the aggregated information to eliminate duplicate data information. Then, the cluster head node transmits the data information after fusion processing to the autonomous underwater vehicle. That is, the cluster head node performs preprocessing data. The multiple sensor nodes are arranged in clusters by performing the following operations.

First, multiple sensor nodes are arranged on the seafloor. In cases that the multiple sensor nodes are divided into 1 to n clusters, for each of the 1 to n clusters, a sum of squared errors (SSE) of sensor nodes to a cluster center is calculated. The number of sensor nodes included in each of the clusters is random. The sum of squared errors (SSE) is calculated by using the following equation:

$$SSE = \sum_{i=1}^{k} \sum_{x \in C_i} \|x - \overline{x_i}\|_2^2 \quad (1)$$

where $C_i$ represents a set of all sensor nodes in a cluster, x represents a value of a coordinate of a sensor node, $\overline{x}_i$ represents a value of a coordinate of a cluster center, k represents the number of the clusters and ranges from 1 to n. In a case that a difference of SSEs of two adjacent clusters reaches maximum, the number k of the clusters is determined as the required number k of clusters. k is calculated by using the following equation:

$$k = \underset{k}{\mathrm{argmax}}\ \Delta S(k) - \Delta S(k+1) \quad (2)$$

In above equation, ΔS represents the difference of SSEs of two adjacent clusters, and the number k of the clusters is determined. Then, k sensor nodes are randomly selected as initial cluster centers based on the k calculated above. SSEs of remaining sensor nodes to the k cluster centers are calculated. Sensor nodes from the remaining sensor nodes are allocated to each of the initial cluster centers based on a closest distance rule. In allocation, the cluster centers and the SSEs are continuously updated and iterated until a convergence condition is met. The cluster centers are updated by using the following equation:

$$\overline{x_i} = \frac{1}{|C_i|} \sum_{x \in C_i} x \quad (3)$$

and the convergence condition is expressed as:

$$|SSE_1 - SSE_2| < \varepsilon \quad (4)$$

where $|C_i|$ represents the number of sensor nodes in a cluster, ε represents a minimum threshold, $SSE_1$ represents an SSE generated in a current iteration, and $SSE_2$ represents an SSE generated in a previous iteration. Coordinates of final cluster centers and sensor nodes included in each of the clusters are determined by continuously performing iteration and updating. After iteration, for each of the clusters, a sensor node closest to a final cluster center of the cluster is determined as an initial cluster head node of the cluster, and the other sensor nodes are determined as ordinary nodes of the cluster. In each of the clusters, the ordinary nodes acquire the data information of the seafloor and then transmit the data information of the seafloor to the cluster head node of the cluster. The cluster head node aggregates data acquired by all the ordinary nodes in the cluster and then transmits the aggregated data to the autonomous underwater vehicle. The above process is performed in a data acquisition period.

Based on the above process, after determining the clustering arrangement of the multiple sensor nodes, the water surface base station transmits clustering arrangement information to the autonomous underwater vehicle. The autonomous underwater vehicle dives and traverses all the sensor nodes, and transmits the clustering arrangement information to each of the sensor nodes. The clustering arrangement is completed after each of the sensor nodes receives the clustering arrangement information.

Specifically, a probability of each of sensor nodes other than a current cluster head node in a cluster to be determined as a cluster head node of the cluster in the next data acquisition period is calculated by using the following equation. The cluster head node in the next data acquisition period is determined based on a calculation result. The newly determined cluster head node performs functions of data aggregation and data transmission. The original cluster head node serves as an ordinary node to perform the function of data acquisition. The equation for determining the cluster head node in the next data acquisition period is expressed as:

$$T(s) = \begin{cases} \dfrac{1}{1 + e^{-(w_1 d_s + w_2 E_j + \lambda)}} & \text{if } s \in G, \\ 0 & \text{otherwise} \end{cases} \quad (5)$$

where T(s) represents a probability of a sensor node s to be determined as the cluster head node of the cluster in the next data acquisition period, G represents a set of all ordinary nodes in the cluster in a current round, $w_1$ and $w_2$ represent weight constant coefficients, $d_s$ represents a reciprocal of a value of a distance between the sensor node s and a center of a cluster corresponding to the sensor node s, $E_j$ represents a ratio of remaining energy to initial energy of the sensor node s, and λ represents an arbitrary constant.

In an embodiment, after a data acquisition period, all the ordinary nodes perform the above probability calculation and transmit probability calculation results to the cluster head node. The cluster head node compares the probability calculation results to determine an ordinary node having a highest probability as a cluster head node in a next data acquisition period, generates a feedback signal, and transmits the feedback signal to the ordinary node having the highest probability. Then, the ordinary node automatically switches the function to be performed from data acquisition to data aggregation and transmission, that is, the ordinary node serves as a cluster head node. The original cluster head node automatically performs the function of data acquisition, that is, the original cluster head node serves as an ordinary node. In an embodiment, after a data acquisition period, the cluster head node automatically performs the function of data acquisition, that is, the cluster head node serves as an ordinary node. An ordinary node is selected based on a random rule or a nearest rule to perform the above probability calculation. In a case that the calculation result is greater than a predetermined value, the ordinary node is determined as a cluster head node in a next data acquisition period. In a case that a calculation result is not greater than a predetermined value, another ordinary node is selected to perform the probability calculation until a probability result calculated by an ordinary node is greater than the predetermined value. In an embodiment, after the data acquisition layer performs data acquisition and aggregation, the water surface base station may select a new cluster head node for each of the clusters based on data simulation calculation and transmits information of the new cluster head node of each of the clusters to the autonomous underwater vehicle before the autonomous underwater vehicle dives. After the autonomous underwater vehicle dives, the autonomous underwater vehicle acquires aggregated data information from each of the cluster head nodes and transmits information of a new cluster head node to the cluster head node. The cluster head nodes inform the nodes that are determined to serve as cluster head nodes. Then, the newly determined cluster head nodes perform the function of data transmission, and the original cluster head nodes serves as ordinary nodes. In an embodiment, after a data acquisition period, the water surface base station may select a cluster head node in a next data acquisition period for each of the clusters based on data simulation calculation, and then transmit information of the cluster head nodes in the next data acquisition period to the autonomous underwater vehicle. The autonomous underwater vehicle dives along an updated running path and transmits the information of the cluster head nodes in the next data acquisition period to the sensor nodes sequentially and correspondingly. The sensor nodes that receive the information of the cluster head nodes in the next data acquisition period serve as cluster head nodes, and the original cluster head nodes automatically serve as ordinary nodes.

It should be understood that the distances between the sensor nodes and the cluster centers and the remaining energy of the sensor nodes are considered in the above algorithm, ensuring that the remaining energy of the sensor node is sufficient to support the functions of data aggregation and data transmission. In addition, since the distances between the ordinary nodes and the newly determined cluster head nodes are similar and short, the energy consumptions due to the transmission distances between the ordinary nodes and the newly determined cluster head node are reduced, realizing energy saving and consumption reduction, and improving service lives of all sensor nodes in a cluster and the data acquisition efficiency.

Figure 2:
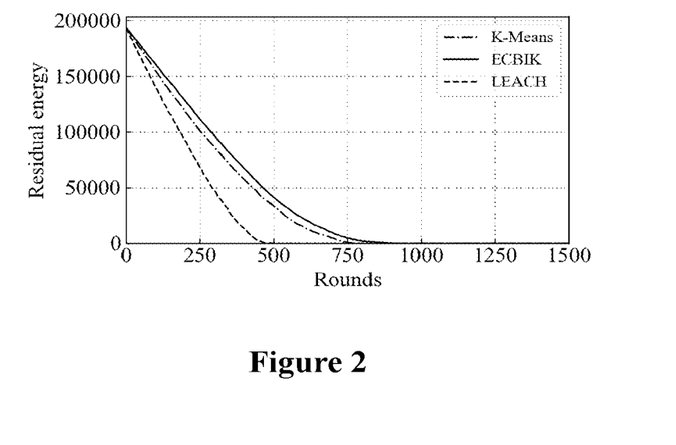
FIG. 2 is a schematic diagram showing comparison of energy consumptions based on a sensor clustering arrangement algorithm, a classic K-means algorithm and an LEACH algorithm, where the sensor clustering arrangement algorithm is adopted in a hierarchical data acquisition system applied to a marine information network according to a preferred embodiment of the present disclosure.
Figure 3:
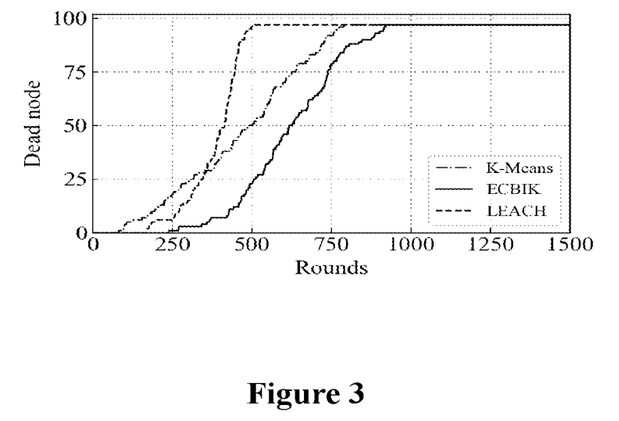
FIG. 3 is a schematic diagram showing comparison of node survival rates based on a sensor clustering arrangement algorithm, a classic K-means algorithm and an LEACH algorithm, where the sensor clustering arrangement algorithm is adopted in a hierarchical data acquisition system applied to a marine information network according to a preferred embodiment of the present disclosure.

In the present disclosure, the above sensor clustering arrangement algorithm is named as ECBIK algorithm. As shown in FIGS. 2 and 3, the ECBIK algorithm according to the present disclosure is compared with the classic K-means algorithm and the LEACH algorithm for the node survival rate and the energy consumption. It can be seen from the comparison results that a time instant at which a dead node occurs based on the ECBIK algorithm according to the present disclosure is later than the time instants based on the classic K-means algorithm and based on the LEACH algorithm, and a time instant at which all nodes died based on the ECBIK algorithm is later than the time instants based on the classic K-means algorithm and that in the LEACH algorithm. With the ECBIK algorithm according to the present disclosure, a high node survival rate is achieved, high remaining energy is maintained, and least energy is consumed in the whole process, thereby achieving a best energy-saving effect.

It should be understood that during the movement of the autonomous underwater vehicle, a running distance between two destinations and an offset angle of the two destinations are required to be considered. A longer running distance and a larger offset angle indicate that the autonomous underwater vehicle is to consume more energy. Thus, it is required to select a path with a shortest distance and a smallest angle change as the running path to reduce the energy consumption of the autonomous underwater vehicle. Therefore, the conventional ant algorithm is improved in the system according to the present disclosure. The autonomous underwater vehicle plans a running path using an ant algorithm based on a distance, an angle and a reward. The improved algorithm includes the following operations.

(1) It is assumed that there are m ants and $N_{ant}$ position points, and all ants are controlled to start from the position point of the water surface base station. A taboo list is created for indicating a set of position points passed by the ants. Each time an ant passes by a position point, the position point is added to the taboo list, indicating that the position points in the taboo list are not be selected as a destination.

(2) A transition probability $p_{ij}^k(t)$ of a first ant from a position point i to a position point u at a time instant when the first ant start from the position point of the base station is calculated. A next position point is selected and the taboo list is updated. Then, another transition probability is calculated, a new position point is selected and the taboo list is updated until the ant traverses all the $N_{ant}$ position points and dies. The transition probability of the ant is calculated by using the following equation:

$$p_{ij}^k(t) = \begin{cases} \dfrac{[\tau_{ij}(t)]^\alpha [\eta_{ij}(t)]^\beta}{\sum\limits_{s \in n(i)} [\tau_{is}(t)]^\alpha [\eta_{is}(t)]^\beta}, & j \in n(i), \\ 0 & \text{others}, \end{cases} \quad (6)$$

where s represents a position at a next time instant, n(i) represents a set of position points adjacent to the position point i, α and β represent weight constants, $\tau_{ij}(t)$ represents a concentration of pheromone, $\eta_{ij}(t)$ represents a heuristic factor and is calculated by using the following equation:

$$\eta_{ij}(t) = \frac{1}{d_{ij}} + \frac{1}{r_{ij}} \quad (7)$$

where $d_{ij}$ represents a distance from the position point i to the position point j, and $r_{ij}$ represents an offset angle from the position point i to the position point j.

Figure 4:
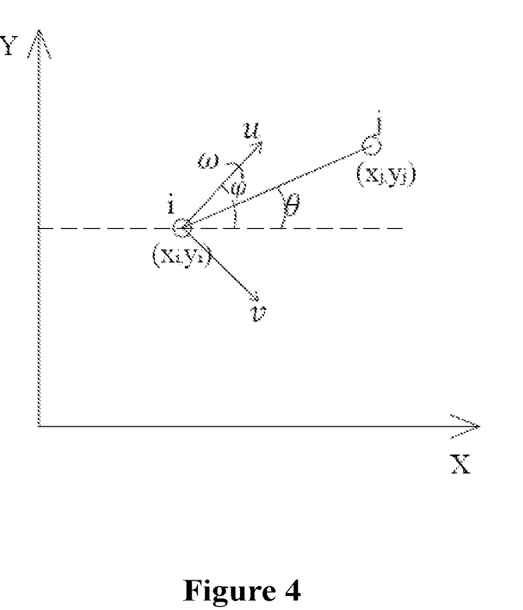
FIG. 4 is a schematic diagram of calculating an offset angle in a hierarchical data acquisition system applied to a marine information network according to a preferred embodiment of the present disclosure.

In addition, as shown in FIG. 4, the autonomous underwater vehicle is located at the position point i at a current time instant and is to drive to the position point j. A state matrix of the autonomous underwater vehicle may be expressed as:

$$\begin{cases} \eta = [x, y, \varphi]^T, \\ v = [u, v, \omega]^T, \end{cases} \quad (8)$$

where η represents a position matrix, v represents a speed matrix, u, v, and w respectively represent a surge speed, a rocking speed and a yaw speed of the autonomous underwater vehicle, φ represents a current orientation angle of the autonomous underwater vehicle. θ in FIG. 4 represents an angle between a vector $\vec{ij}$ and a horizontal direction. A difference between φ and θ is defined as the offset angle of the autonomous underwater vehicle from the position point i to the position point j, that is, $r_{ij}$. The offset angle $r_{ij}$ from the position point i to the position point j may be calculated by using the following equation:

$$r_{ij} = \varphi - \theta = \varphi - \arctan\frac{(y_j - y_i)}{(x_j - x_i)}, \qquad (9)$$

where $x_i$ and $y_i$ respectively represent an abscissa of the position point i and an ordinate of the position point i, and $x_j$ and $y_j$ respectively represent an abscissa of the position point j and an ordinate of the position point j.

It is assumed that $\eta_{t+1}$ represents a position of the autonomous underwater vehicle at a next time instant, then $$\eta_{t+1} = J(\eta)v \qquad (10)$$

where $J(\eta)$ represents a motion transition matrix and may be expressed as:

$$J(\eta) = \begin{pmatrix} \cos\varphi & -\sin\varphi & 0 \\ \sin\varphi & \cos\varphi & 0 \\ 0 & 0 & 1 \end{pmatrix} \qquad (11)$$

Since the initial position point and the running speed of the autonomous underwater vehicle are known, the coordinates of the next position point may be calculated by using the equations (10) and (11), and then the offset angle $r_{ij}$ between the two position points is calculated.

(3) A concentration $\Delta\tau_{ij}^k$ of pheromone left by the ant on each of paths is calculated by using the following equation:

$$\Delta\tau_{ij}^k = \frac{Q_1}{d_{ij}} + \frac{Q_2}{r_{ij}} + \gamma \sum_{s \in n(j), s \neq i=} P_{js} \Delta\tau_{js}^k \qquad (12)$$

where $Q_1$ and $Q_2$ represent arbitrary constants, $\gamma$ represents a reward factor indicating a degree of an influence on a current path selection by a concentration of pheromone of a subsequent path, $\gamma$ ranges from 0 to 1, and $P_{js}$ represents a transfer probability of the ant at the next time instant.

(4) The above operations (2) and (3) are repeated until each of the m ants traverses all the position points. A pheromone increment $\Delta\tau_{ij}$ and a total pheromone $\tau_{ij}(t+1)$ of each of the paths are calculated by using the following equations:

$$\Delta\tau_{ij} = \sum_{k=1}^{m} \Delta\tau_{ij}^m$$

$$\tau_{ij}(t+1) = (1-\rho)\tau_{ij}(t) + \Delta\tau_{ij}$$

where $\rho$ represents a pheromone evaporation coefficient indicating an amount of pheromone reduced, and $(1-\rho)$ represents a pheromone residual coefficient indicating a concentration of remaining pheromone.

(5) A sum of distances and a sum of offset angles generated in a current iteration are recorded, and a current optimal path is updated based on a recorded result. A path having a smallest sum of distances and a smallest sum of offset angles is selected as an updated optimal path.

(6) Iteration is performed continuously until the number of iterations reaches a predetermined number or a stagnation occurs, then iteration is stopped and an optimal path updated after a last iteration is determined as the running path. If the number of iterations does not reach the predetermined number and the stagnation does not occur, proceed to the operation of (1) to perform iteration.

Figure 5:
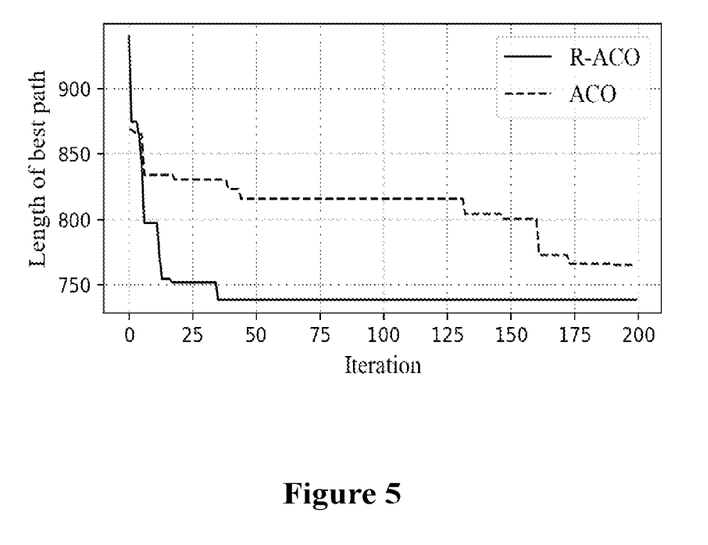
FIG. 5 is a schematic diagram showing comparison of shortest paths obtained by using a path planning algorithm and a classic ant algorithm, where the path planning algorithm is adopted in a hierarchical data acquisition system applied to a marine information network according to a preferred embodiment of the present disclosure.
Figure 6:
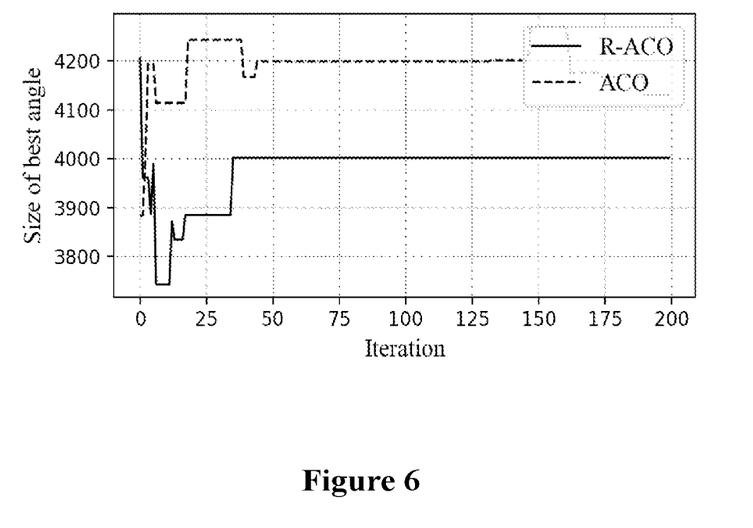
FIG. 6 is a schematic diagram showing comparison of offset angles obtained by using a path planning algorithm and a classic ant algorithm, where the path planning algorithm is adopted in a hierarchical data acquisition system applied to a marine information network according to a preferred embodiment of the present disclosure.

It should be understood that the improved path planning algorithm in the present disclosure is named as R-ACO algorithm. With the R-ACO algorithm, influences caused by distance and angle offset are considered, and the calculated running path has a small running path and a small offset angle, greatly reducing the energy consumption of the autonomous underwater vehicle. In addition, the influence of the concentration of the pheromone in a subsequent state on the selection of the current path is considered in equation (12), achieving a hyperopia effect, an overall optimization, a high solution efficiency and a fast convergence. As shown in FIGS. 5 and 6, the R-ACO algorithm according to the present disclosure is compared with the classic ant algorithm ACO for the shortest path and the minimum offset angle. It can be obviously seen from the comparison results that the running distance and the offset angle that are calculated using the R-ACO algorithm according to the present disclosure are smaller than the running distance and the offset angle that are calculated using the classic ACO algorithm, and the convergence time based on the R-ACO algorithm is shorter than the convergence time based on the classic ACO algorithm.

Figure 7:
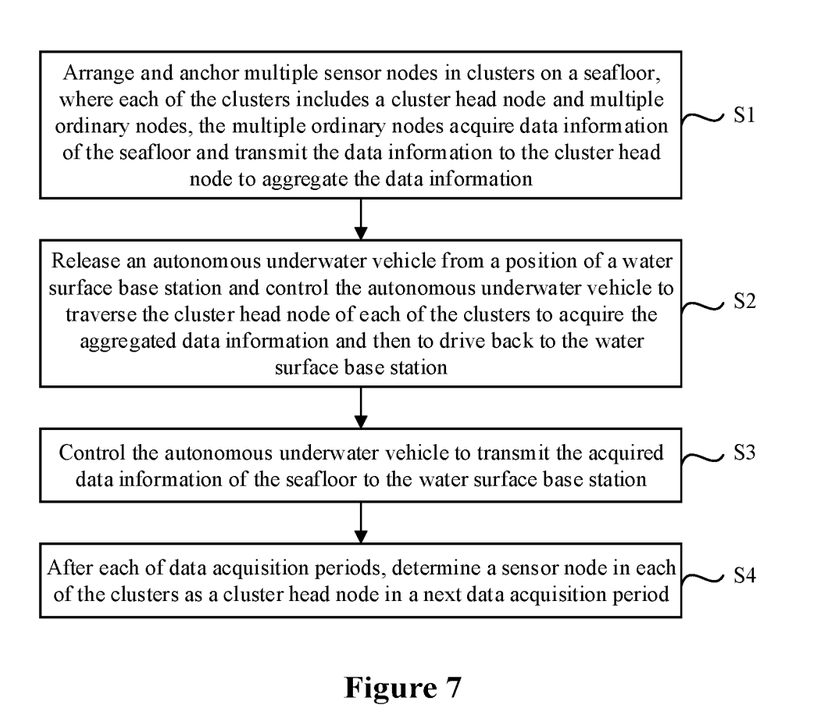
FIG. 7 is a flow chart of a hierarchical data acquisition method applied to a marine information network according to an embodiment of the present disclosure.

In addition, as shown in FIG. 7, a hierarchical data acquisition method applied to a marine information network is further provided according to an embodiment of the present disclosure. The method is preferably applied to the hierarchical data acquisition system according to the above embodiments. The hierarchical data acquisition method includes the following steps S1 to S4.

In step S1, multiple sensor nodes are arranged and anchored in clusters on a seafloor. Each of the clusters includes a cluster head node and multiple ordinary nodes. The multiple ordinary nodes acquire data information of the seafloor and transmit the data information to the cluster head node to aggregate the data information.

In step S2, an autonomous underwater vehicle is released from a position of a water surface base station, and the autonomous underwater vehicle is controlled to traverse the cluster head node of each of the clusters to acquire the aggregated data information and then to drive back to the water surface base station.

In step S3, the autonomous underwater vehicle is controlled to transmit the acquired data information of the seafloor to the water surface base station.

In step S4, after each of data acquisition periods, a sensor node in each of the clusters is determined as a cluster head node in a next data acquisition period.

It should be understood that in the hierarchical data acquisition method applied to a marine information network according to the embodiment, multiple sensor nodes are arranged in clusters. For each of the clusters, one cluster head node and multiple ordinary nodes are included, the multiple ordinary sensor nodes acquire the data information of the seafloor and transmit the data information to the cluster head node, and the cluster head node aggregates the data from the ordinary nodes in the cluster and transmits the aggregated data to an autonomous underwater vehicle. The ordinary nodes perform data acquisition function and the cluster head node performs data transmission function, greatly reducing energy consumptions of the sensor nodes, prolonging service lives of the sensors in the data acquisition layer, and greatly improving the data acquisition efficiency of the data acquisition layer. In addition, after each of data acquisition periods, a sensor node in each of the clusters is determined as a cluster head node in a next data acquisition period. Since energy consumption of the cluster head node is higher than energy consumption of the ordinary nodes, the sensor, serving as the cluster head node, consumes energy very quickly and then dies soon, resulting in low data acquisition efficiency of the cluster. Thus, each of the cluster head nodes are determined in each of the acquisition periods in the system according to the present disclosure, well balancing energy consumption of all sensor nodes in the cluster. The original cluster head node with low energy may serve as an ordinary node to perform data acquisition function, and the new cluster head node with high energy may perform data transmission function well. The cluster head nodes are continuously updated in cycles. Finally, in a case that all the sensor nodes run out of energy and tend to death, all the sensor nodes are replaced at one time, greatly improving the data acquisition efficiency of the cluster, maximally using the energy of all sensor nodes in the cluster, thereby achieving energy saving and high efficiency.

It should be understood that in step S4, a probability of each of sensor nodes in a cluster to be determined as a cluster head node in the next data acquisition period is calculated by using the following equation:

$$T(s) = \begin{cases} \dfrac{1}{1 + e^{-(w_1 d_s + w_2 E_j + \lambda)}} & \text{if } s \in G, \\ 0 & \text{otherwise} \end{cases} \quad (5)$$

and the cluster head node in the next data acquisition period is determined based on a calculation result, in the above equation, T(s) represents a probability of a sensor node s to be determined as the cluster head node of the cluster in the next data acquisition period, G represents a set of all ordinary nodes in the cluster in a current round, $w_1$ and $w_2$ represent weight constant coefficients, $d_s$ represents a reciprocal of a value of a distance between the sensor node s and a center of a cluster corresponding to the sensor node s, $E_j$ represents a ratio of remaining energy to initial energy of the sensor node s, and λ represents an arbitrary constant.

Figure 8:
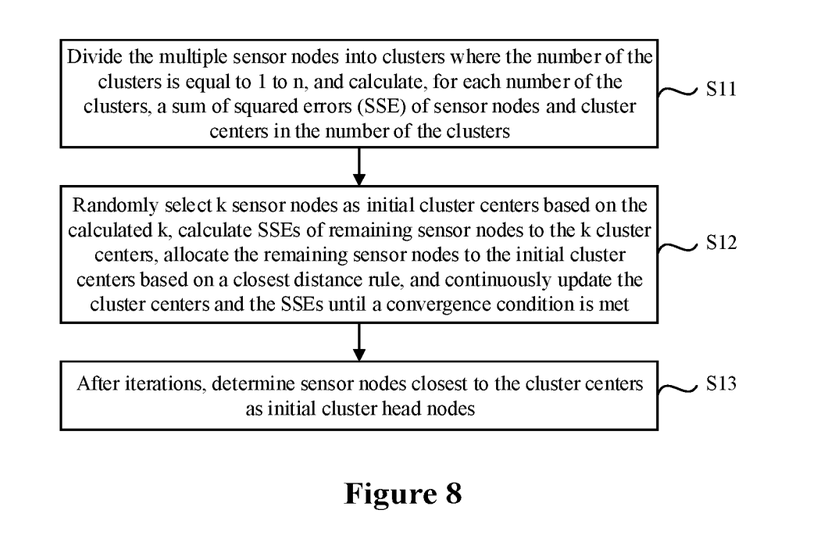
FIG. 8 is a flow chart of sub steps of arranging multiple sensor nodes in clusters in step S1 in FIG. 7.

It should be understood that, as shown in FIG. 8, the operation of arranging multiple sensor nodes in clusters in step 1 includes the following sub steps S11 to S13.

In step S11, in cases that the multiple sensor nodes are divided into 1 to n clusters, for each of the 1 to n clusters, a sum of squared errors (SSE) of sensor nodes to a cluster center is calculated by using the following equation:

$$SSE = \sum_{i=1}^{k} \sum_{x \in C_i} \|x - \bar{x}_i\|_2^2 \quad (1)$$

where $C_i$ represents a set of all sensor nodes in a cluster, x represents a value of a coordinate of a sensor node, $\bar{x}_i$ represents a value of a coordinate of a cluster center, k represents the number of the clusters. In a case that a difference of SSEs of two adjacent clusters reaches maximum, the number of the clusters is determined as the required number k of clusters, where k is calculated by using the following equation:

$$k = \underset{k}{\mathrm{argmax}}\, \Delta S(k) - \Delta S(k+1) \quad (2)$$

where ΔS represents the difference of SSEs of two adjacent clusters.

In step S12, k sensor nodes are randomly selected as initial cluster centers based on the calculated k. SSEs of remaining sensor nodes to the k cluster centers are calculated. Sensor nodes from the remaining sensor nodes are allocating for each of the initial cluster centers based on a closest distance rule. The cluster centers and the SSEs are continuously updated until a convergence condition is met. The cluster centers are updated by using the following equation:

$$\bar{x}_i = \dfrac{1}{|C_i|} \sum_{x \in C_i} x \quad (3)$$

and the convergence condition is expressed as:

$$|SSE_1 - SSE_2| < \varepsilon \quad (4)$$

where $|C_i|$ represents the number of sensor nodes in a cluster, e represents a minimum threshold. $SSE_1$ represents an SSE generated in a current iteration, and $SSE_2$ represents an SSE generated in a previous iteration.

In step S13, after iteration, a sensor node closest to each of the cluster centers is determined as an initial cluster head node.

Figure 9:
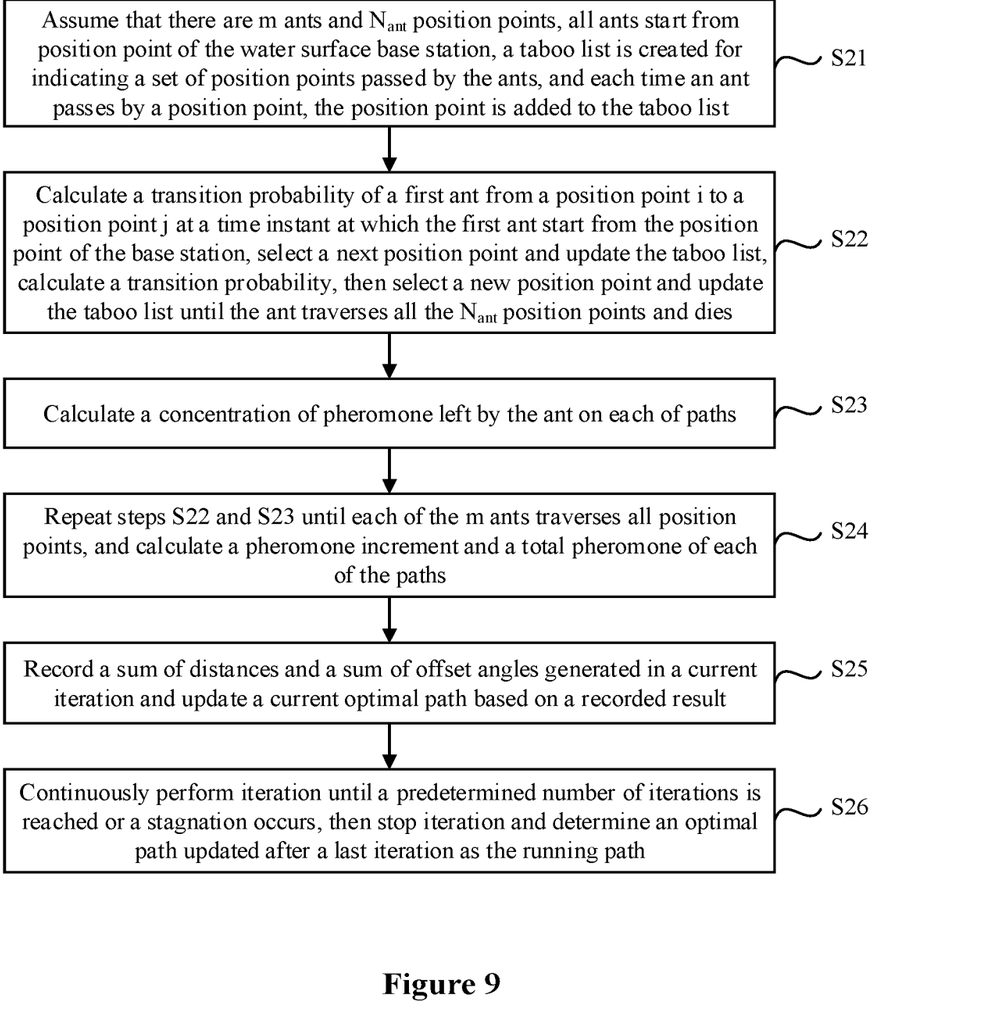
FIG. 9 is a flow chart of sub steps of a path planning algorithm in step S2 in FIG. 7.

It should be understood that, as shown in FIG. 9, a running path is planed using an ant algorithm based on a distance, an angle and a reward in step S2. The algorithm includes the following steps S21 to S26.

In step S21, it is assumed that there are m ants and $N_{ant}$ position points, all ants are controlled to start from a position point of the water surface base station, a taboo list is created for indicating a set of position points passed by the ants, and each time an ant passes by a position point, the position point is added to the taboo list.

In step S22, a transition probability $p_{ij}^k(t)$ of a first ant from a position point i to a position point j at a time instant when the first ant start from the position point of the base station is calculated, a next position point is selected and the taboo list is updated, another transition probability is calculated, then a new position point is selected and the taboo list is updated until the ant traverses all the $N_{ant}$ position points and dies. The transition probability of the ant is calculated by using the following equation:

$$p_{ij}^k(t) = \begin{cases} \dfrac{[\tau_{ij}(t)]^\alpha [\eta_{ij}(t)]^\beta}{\sum_{s \in n(i)} [\tau_{is}(t)]^\alpha [\eta_{is}(t)]^\beta}, & j \in n(i), \\ 0 & \text{others} \end{cases} \quad (6)$$

where s represents a position at a next time instant, n(i) represents a set of position points adjacent to the position point i, α and β represent weight constants, $\tau_{ij}(t)$ represents a concentration of pheromone, $\eta_{ij}(t)$ represents a heuristic factor and is calculated by using the equation of $$\eta_{ij} = \dfrac{1}{d_{ij}} + \dfrac{1}{r_{ij}},$$

where $d_{ij}$ represents a distance from the position point i to the position point j, and $r_{ij}$ represents an offset angle from the position point i to the position point j.

In step S23, a concentration $\Delta\tau_{ij}^k$ of pheromone left by the ant on each of paths is calculated by using the following equation:

$$\Delta\tau_{ij}^k = \frac{Q_1}{d_{ij}} + \frac{Q_2}{r_{ij}} + \gamma \sum_{s \in n(j), s \neq i} P_{js} \Delta\tau_{js}^k,$$

where $Q_1$ and $Q_2$ represent arbitrary constants, $\gamma$ represents a reward factor indicating a degree of an influence on a current path selection by a concentration of pheromone of a subsequent path, $\gamma$ ranges from 0 to 1, and $P_{js}$ represents a transfer probability of the ant at the next time instant.

In step S24, steps S22 and S23 are repeated until each of the m ants traverses all the position points, and a pheromone increment $\Delta\tau_{ij}$ and a total pheromone $\tau_{ij}(t+1)$ of each of the paths are calculated by using the following equations:

$$\Delta\tau_{ij} = \sum_{k=1}^{m} \Delta\tau_{ij}^m$$

$$\tau_{ij}(t+1) = (1-\rho)\tau_{ij}(t) + \Delta\tau_{ij}$$

where $\rho$ represents a pheromone evaporation coefficient indicating an amount of pheromone reduced, and $(1-\rho)$ represents a pheromone residual coefficient indicating a concentration of remaining pheromone.

In step S25, a sum of distances and a sum of offset angles generated in a current iteration are recorded, and a current optimal path is updated based on a recorded result.

In step S26, iteration is performed continuously until the number of iterations reaches a predetermined number or a stagnation occurs, then the iteration is stopped and an optimal path updated after a last iteration is determined as the running path.

The offset angle $r_{ij}$ in step S22 may be calculated by using the following equation:

$$r_{ij} = \varphi - \theta = \varphi - \arctan\frac{(y_j - y_i)}{(x_j - x_i)} \quad (9)$$

where $x_i$ and $y_i$ respectively represent an abscissa of the position point i and an ordinate of the position point i, $x_j$ and $y_j$ respectively represent an abscissa of the position point j and an ordinate of the position point j, $\varphi$ represents a current orientation angle of the autonomous underwater vehicle, and $\theta$ represents an angle between a vector $\vec{ij}$ and a horizontal direction.

In addition, it should be understood that the operations performed in the sub-steps in the method embodiments are the same as the operations performed in the sub-steps in the system embodiments, which are not repeated herein.

The above descriptions are merely preferred embodiments of the present disclosure and are not intended to limit the present disclosure, and those skilled in the art may make various modifications and variations to the present disclosure. Any modifications, equivalent substitutions and improvements made within the spirit and the principle of the present disclosure are within the protection scope of the present disclosure.

The invention claimed is:

1. A hierarchical data acquisition system applied to a marine information network, comprising: a water surface base station, a data acquisition layer, and a data transmission layer, wherein the data acquisition layer is configured to acquire data information of a seafloor and comprises a plurality of sensor nodes anchored on the seafloor, wherein the plurality of sensor nodes are arranged in clusters, each of the clusters comprises one cluster head node and a plurality of ordinary nodes, and the plurality of ordinary nodes are configured to acquire the data information of the seafloor and transmit the data information to the cluster head node to aggregate the data information, and the plurality of sensor nodes are arranged in clusters by:

in cases that the plurality of sensor nodes are divided into 1 to n clusters, calculating, for each of the 1 to n clusters, a sum of squared errors (SSE) of sensor nodes to a cluster center, wherein the number of sensor nodes comprised in each of the clusters is random, and the sum of squared errors SSE) is calculated by using the following equation:

$$SSE = \sum_{i=1}^{k} \sum_{x \in C_i} \|x - \bar{x}_i\|_2^2$$

where $C_i$ represents a set of all sensor nodes in a cluster, x represents a value of a coordinate of a sensor node, $\bar{x}_i$ represents a value of a coordinate of a cluster center, k represents the number of the clusters and ranges from 1 to n;

in a case that a difference of SSEs of two adjacent clusters reaches maximum, determining the number of the clusters as the required number k of clusters, wherein k is calculated by using the following equation:

$$k = \underset{k}{\mathrm{argmax}}\, \Delta S(k) - \Delta S(k+1)$$

where $\Delta S$ represents the difference of SSEs of two adjacent clusters, and the number k of the clusters is determined;

randomly selecting k sensor nodes as initial cluster centers based on the calculated k, calculating SSEs of remaining sensor nodes to the k cluster centers, allocating, for each of the initial cluster centers, sensor nodes from the remaining sensor nodes based on a closest distance rule, and continuously updating the cluster centers and the SSEs until a convergence condition is met, where the cluster centers are updated by using the following equation:

$$\bar{x}_i = \frac{1}{|C_i|} \sum_{x \in C_i} x$$

and the convergence condition is expressed as:

$|SSE_1 - SSE_2| < \varepsilon$ where $|C_i|$ represents the number of sensor nodes in a cluster, $\varepsilon$ represents a minimum threshold, $SSE_1$ represents an SSE generated in a current iteration, and SSE$_2$ represents an SSE generated in a previous iteration, and coordinates of final cluster centers and sensor nodes included in each of the clusters are determined by continuously performing iteration and updating; and after iteration, determining, for each of the clusters, a sensor node closest to the cluster center of the cluster as an initial cluster head node of the cluster, and determining the other sensor nodes as ordinary nodes of the cluster;

the data transmission layer is arranged above the data acquisition layer and is configured to transmit the data information of the seafloor acquired by the data acquisition layer to the water surface base station, and the data transmission layer comprises an autonomous underwater vehicle, wherein the autonomous underwater vehicle is configured to start from the water surface base station to traverse the cluster head node of each of the clusters to acquire the aggregated data information and then drive back to the water surface base station to transmit the acquired data information of the seafloor to the water surface base station; and after each of data acquisition periods, a sensor node in each of the clusters is determined as a cluster head node in a next data acquisition period wherein a probability of each of sensor nodes in a cluster except a cluster head node of the cluster to be determined as a cluster head node of the cluster in the next data acquisition period is calculated by using the following equation:

$$T(s) = \begin{cases} \dfrac{1}{1+e^{-(w_1 d_s + w_2 S_j + \lambda)}} & \text{if } s \in G, \\ 0 & \text{otherwise} \end{cases}$$

and the cluster head node of the cluster in the next data acquisition period is determined based on a calculation result, in the above equation, T(s) represents a probability of a sensor node s to be determined as the cluster head node of the cluster in the next data acquisition period, G represents a set of all ordinary nodes in the cluster in a current round, $w_1$ and $w_2$ represent weight constant coefficients, $d_s$ represents a reciprocal of a value of a distance between the sensor node s and a center of a cluster corresponding to the sensor node s, $E_j$ represents a ratio of remaining energy to initial energy of the sensor node s, and $\lambda$, represents an arbitrary constant.

2. The hierarchical data acquisition system applied to a marine information network according to claim 1, wherein the autonomous underwater vehicle is configured to plan a running path using an ant algorithm based on a distance, an angle and a reward, and the algorithm comprises:

assuming that there are m ants and $N_{ant}$ position points, and all ants are controlled to start from a position point of the water surface base station, and creating a taboo list for indicating a set of position points passed by the ants, and adding, each time an ant passes by a position point, the position point to the taboo list;

calculating a transition probability $p_{ij}^k(t)$ of a first ant from a position point i to a position point j at a time instant when the first ant start from the position point of the base station, selecting a next position point and updating the taboo list, calculating another transition probability, then selecting a next position point and updating the taboo list until the ant traverses all the $N_{ant}$ position points and dies, wherein the transition probability of the ant is calculated by using the following equation:

$$p_{ij}^k(t) \begin{cases} \dfrac{[\tau_{ij}(t)]^\alpha [\eta_{ij}(t)]^\beta}{\sum_{s \in n(i)} [\tau_{is}(t)]^\alpha [\eta_{is}(t)]^\beta}, & j \in n(i), \\ 0 & \text{others.} \end{cases}$$

where s represents a position at a next time instant, n(i) represents a set of position points adjacent to the position point i, $\alpha$ and $\beta$ represent weight constants, $\tau_{ij}(t)$ represents a concentration of pheromone from the position point i to the position point j at a time instant t, $\tau_{is}(t)$ represents a concentration of pheromone from the position point i to a position point s at the time instant t, $\eta_{ij}(t)$ represents a heuristic factor from the position point i to the position point j at the time instant t, $\eta_{is}(t)$ represents a heuristic factor from the position point i to the position point s at the time instant t, and $$\eta_{ij}(t) = \dfrac{1}{d_{ij}} + \dfrac{1}{r_{ij}},$$

where $d_{ij}$ represents a distance from the position point i to the position point j, and $r_{ij}$ represents an offset angle from the position point i to the position point j;

calculating a concentration $\Delta\tau_{ij}^k$ of pheromone left by the ant on each of paths by using the following equation:

$$\Delta\tau_{ij}^k = \dfrac{Q_1}{d_{ij}} + \dfrac{Q_2}{r_{ij}} + \gamma \sum_{s \in n(j), s \neq i} P_{js} \Delta\tau_{js}^k,$$

where $Q_1$ and $Q_2$ represent arbitrary constants, $\gamma$ represents a reward factor indicating a degree of an influence on a current path selection by a concentration of pheromone of a subsequent path, $\gamma$ ranges from 0 to 1, $P_{js}$ represents a transfer probability of the ant at the next time instant, and $\Delta\tau_{js}^k$ represents a concentration of pheromone generated by an ant k at the next time instant;

repeating the above processing until each of the m ants traverses all the position points, and calculating a pheromone increment $\Delta\tau_{ij}$ and a total pheromone $\Delta\tau_{ij}$(t+1) of each of the paths by using the following equations:

$$\Delta\tau_{ij} = \sum_{k=1}^{m} \Delta\tau_{ij}^m$$

$$\tau_{ij}(t+1) = (1-\rho)\tau_{ij}(t) + \Delta\tau_{ij}$$

where $\rho$ represents a pheromone evaporation coefficient indicating an amount of reduced pheromone, and (1-$\rho$) represents a pheromone residual coefficient indicating a concentration of remaining pheromone;

recording a sum of distances and a sum of offset angles generated in a current iteration, and updating a current optimal path based on a recorded result; and continuously performing iteration until the number of iterations reaches a predetermined number or a stagnation occurs, then stopping iteration and determining an optimal path updated after a last iteration as the running path.

3. The hierarchical data acquisition system applied to a marine information network according to claim 2, wherein the offset angle $r_{ij}$ from the position point i to the position point j is calculated by using the following equation:

$$r_{ij} = \varphi - \theta = \varphi - \arctan\frac{(y_j - y_i)}{(x_j - x_i)}$$

where $x_i$ and $y_i$ respectively represent an abscissa of the position point i and an ordinate of the position point i, $x_j$ and $y_j$ respectively represent an abscissa of the position point j and an ordinate of the position point j, $\varphi$ represents a current orientation angle of the autonomous underwater vehicle, and $\theta$ represents an angle between a vector $\vec{ij}$ and a horizontal direction.

4. A hierarchical data acquisition method applied to a marine information network, comprising the following steps:
- step S1: arranging and anchoring a plurality of sensor nodes in clusters on a seafloor, wherein each of the clusters comprises a cluster head node and a plurality of ordinary nodes, the plurality of ordinary nodes acquire data information of the seafloor and transmit the data information to the cluster head node to aggregate the data information;
- step S2: releasing an autonomous underwater vehicle from a position of a water surface base station, and controlling the autonomous underwater vehicle to traverse the cluster head node of each of the clusters to acquire the aggregated data information and then to drive back to the water surface base station;
- step S3: controlling the autonomous underwater vehicle to transmit the acquired data information of the seafloor to the water surface base station; and
- step S4: after each of data acquisition periods, determining a sensor node in each of the clusters as a cluster head node in a next data acquisition period;
wherein the arranging a plurality of sensor nodes in clusters in step S1 comprises the following steps:
- step S11: in cases that the plurality of sensor nodes are divided into 1 to n clusters, calculating, for each of the 1 to n clusters, a sum of squared errors (SSE) of sensor nodes to a cluster center, wherein the number of sensor nodes comprised in each of the clusters is random, and the sum of squared errors (SSE) is calculated by using the following equation:

$$SSE = \sum_{i=1}^{k}\sum_{x \in C_i}\|x - \overline{x}_i\|_2^2$$

where $C_i$ represents a set of all sensor nodes in a cluster, x represents a value of a coordinate of a sensor node, $\overline{x}_i$ represents a value of a coordinate of a cluster center, k represents the number of the clusters and ranges from 1 to n;
in a case that a difference of SSEs of two adjacent clusters reaches maximum, determining the number of the clusters as the required number k of clusters, wherein k is calculated by using the following equation:

$$k = \underset{k}{\operatorname{argmax}}\Delta S(k) - \Delta S(k+1)$$

where $\Delta S$ represents the difference of SSEs of two adjacent clusters, and the number k of the clusters is determined;
- step S12: randomly selecting k sensor nodes as initial cluster centers based on the calculated k, calculating SSEs of remaining sensor nodes to the k cluster centers, allocating, for each of the initial cluster centers, sensor nodes from the remaining sensor nodes based on a closest distance rule, and continuously updating the cluster centers and the SSEs until a convergence condition is met, where the cluster centers are updated by using the following equation:

$$x_i = \frac{1}{|C_i|}\sum_{x \in C_i} x$$

and the convergence condition is expressed as:

$$|SSE_1 - SSE_2| < \varepsilon$$

where $|C_i|$ represents the number of sensor nodes in a cluster, $\varepsilon$ represents a minimum threshold, $SSE_1$ represents an SSE generated in a current iteration, $SSE_2$ represents an SSE generated in a previous iteration, and coordinates of final cluster centers and sensor nodes included in each of the clusters are determined by continuously performing iteration and updating; and
- step S13: after iteration, determining, for each of the clusters, a sensor node closest to the cluster center of the cluster as an initial cluster head node of the cluster, and determining the other sensor nodes as ordinary nodes of the cluster; and
wherein a probability of each of sensor nodes in a cluster to be determined as a cluster head node in the next data acquisition period is calculated in step 4 by using the following equation:

$$T(s) = \begin{cases} \dfrac{1}{1 + e^{-(w_1 d_s + w_2 E_j + \lambda)}} & \text{if } s \in G, \\ 0 & \text{otherwise} \end{cases}$$

and the cluster head node in the next data acquisition period is determined based on a calculation result,
in the above equation, T(s) represents a probability of a sensor node s to be determined as the cluster head node of the cluster in the next data acquisition period, G represents a set of all ordinary nodes in the cluster in a current round, $w_1$ and $w_2$ represent weight constant coefficients, $d_s$ represents a reciprocal of a value of a distance between the sensor node s and a center of a cluster corresponding to the sensor node s, $E_j$ represents a ratio of remaining energy to initial energy of the sensor node s, and $\lambda$ represents an arbitrary constant.

5. The hierarchical data acquisition method applied to a marine information network according to claim 4, wherein a running path is planed using an ant algorithm based on a distance, an angle and a reward in step S2, and the algorithm comprises the following steps:

step S21: assuming that there are m ants and $N_{ant}$ position points, and all ants are controlled to start from a position point of the water surface base station, and creating a taboo list for indicating a set of position points passed by the ants, and adding, each time an ant passes by a position point, the position point to the taboo list;

step S22: calculating a transition probability $p_{ij}^k(t)$ of a first ant from a position point i to a position point j at a time instant when the first ant start from the position point of the base station, selecting a next position point and updating the taboo list, calculating another transition probability, then selecting a next position point and updating the taboo list until the ant traverses all the $N_{ant}$ position points and dies, wherein the transition probability of the ant is calculated by using the following equation:

$$p_{ij}^k(t) = \begin{cases} \dfrac{[\tau_{ij}(t)]^\alpha [\eta_{ij}(t)]^\beta}{\sum_{s \in n(i)} [\tau_{is}(t)]^\alpha [\eta_{is}(t)]^\beta}, & j \in n(i), \\ 0 & \text{others.} \end{cases}$$

where s represents a position at a next time instant, n(i) represents a set of position points adjacent to the position point i, $\alpha$ and $\beta$ represent weight constants, $\tau_{ij}(t)$ represents a concentration of pheromone from the position point i to the position point j at a time instant t, $\tau_{is}(t)$ represents a concentration of pheromone from the position point i to a position point s at the time instant t, $\eta_{ij}(t)$ represents a heuristic factor from the position point i to the position point j at the time instant t, $\eta_{is}(t)$ represents a heuristic factor from the position point i to the position point s at the time instant t, and $$\eta_{ij}(t) = \frac{1}{d_{ij}} + \frac{1}{r_{ij}},$$

where $d_{ij}$ represents a distance from the position point i to the position point j, and $r_{ij}$ represents an offset angle from the position point i to the position point j;

step S23: calculating a concentration $\Delta\tau_{ij}^k$ of pheromone left by the ant on each of paths by using the following equation:

$$\Delta\tau_{ij}^k = \frac{Q_1}{d_{ij}} + \frac{Q_2}{r_{ij}} + \gamma \sum_{s \in n(j), s \neq i} P_{js} \Delta\tau_{js}^k,$$

where $Q_1$ and $Q_2$ represent arbitrary constants, $\gamma$ represents a reward factor indicating a degree of an influence on a current path selection by a concentration of pheromone of a subsequent path, $\gamma$ ranges from 0 to 1, $P_{js}$ represents a transfer probability of the ant at the next time instant, and $\Delta\tau_{js}^k$ represents a concentration of pheromone generated by an ant k at the next time instant;

step S24: repeating steps 22 and 23 until each of the m ants traverses all the position points, and calculating a pheromone increment $\Delta\tau_{ij}$ and a total pheromone $\tau_{ij}(t+1)$ of each of the paths by using the following equations:

$$\Delta\tau_{ij} = \sum_{k=1}^{m} \Delta\tau_{ij}^m$$

$$\tau_{ij}(t+1) = (1-\rho)\tau_{ij}(t) + \Delta\tau_{ij}$$

where $\rho$ represents a pheromone evaporation coefficient indicating an amount of reduced pheromone, and (1-$\rho$) represents a pheromone residual coefficient indicating a concentration of remaining pheromone;

step S25: recording a sum of distances and a sum of offset angles generated in a current iteration, and updating a current optimal path based on a recorded result; and step S26: continuously performing iteration until the number of iterations reaches a predetermined number or a stagnation occurs, then stopping iteration and determining an optimal path updated after a last iteration as the running path.

6. The hierarchical data acquisition method applied to a marine information network according to claim 5, wherein the offset angle $r_{ij}$ in step S22 is calculated by using the following equation:

$$r_{ij} = \varphi - \theta = \varphi - \arctan\frac{(y_j - y_i)}{(x_j - x_i)}$$

where $x_i$ and $y_i$ respectively represent an abscissa of the position point i and an ordinate of the position point i, $x_j$ and $y_j$ respectively represent an abscissa of the position point j and an ordinate of the position point j, $\varphi$ represents a current orientation angle of the autonomous underwater vehicle, and $\theta$ represents an angle between a vector $\vec{ij}$ and a horizontal direction.

* * * * *